UNITED STATES PATENT OFFICE.

HENRI J. BANG, OF NEW YORK, N. Y.

IMPROVEMENT IN DISINFECTING COMPOUNDS.

Specification forming part of Letters Patent No. 187,802, dated February 27, 1877; application filed February 1, 1877.

*To all whom it may concern:*

Be it known that I, HENRI J. BANG, of the city, county, and State of New York, have invented a new and useful Improved Disinfecting Compound, which invention is fully set forth in the following specification:

This invention relates to a compound produced from extract of pine-needles, extract of juniper-berries, oil of pine-needles, oil of juniper-berries, and maple-sugar.

In carrying out my invention I first prepare the extracts and oils above named in the following manner: I take a quantity of the young branches and needles of pine trees, place the same together with a quantity of water in a closed vessel provided with a goose-neck, which communicates with a suitable condenser, and then I boil the needles. During the operation of boiling, the vapors which pass off through the goose-neck are condensed and produce the pine-needle oil, and after the operation of boiling has been continued for a sufficient length of time, the vessel is opened, the liquid contained therein is passed through a strainer, and then it is boiled down to the required consistency, thus producing the pine-needle extract.

The extract and oil of juniper-berries are produced by first pounding a quantity of berries, then boiling the same in a closed vessel, as above, the vapors passing over being condensed to form the oil, while the residuum is strained and then boiled down to form the extract.

While boiling down the extract, I add to it a small quantity of maple-sugar, as hereafter stated, to increase its consistency.

It must be remarked, however, that the extract and the oil of pine-needles form an article of commerce, so that the same can be bought in the market.

In preparing my compound, I take extract of pine needles, about two ounces; extract of juniper-berries, about one ounce; oil of pine-needles, about one-half ounce; oil of juniper-berries, about one-fourth ounce; maple-sugar, about one-fourth ounce.

This quantity of maple-sugar is added to the extract of juniper-berries during the operation of boiling down this extract, as above stated.

After all the ingredients have been carefully and intimately mixed, my compound is ready for use.

I pour a small quantity thereof, into an open vessel containing water, and by placing this vessel on a heater, the water, together with the disinfecting compound are evaporated, and the air in the room is impregnated with the vapors of my compound. These vapors purify the air, they counteract diseases of the throat, lungs, and chest, and prevent contagion in sick-rooms.

My compound can be used with great advantage in hospitals and on board of vessels, also in schools, crowded tenement-houses, and other places of a similar nature.

What I claim as new, and desire to secure by Letters Patent, is—

A disinfecting composition consisting of maple-sugar, and of the oils and extracts of pine-needles and juniper-berries, in about the proportions herein set forth.

In testimony that I claim the foregoing I have hereunto set my hand and seal this 29th day of January, 1877.

HENRI J. BANG. [L. S.]

Witnesses:
 W. HAUFF,
 E. F. KASTENHUBER.